C. C. DRISCOLL.
WATERING DEVICE FOR POULTRY AND ANIMALS.
APPLICATION FILED JUNE 4, 1912.
1,113,206.
Patented Oct. 13, 1914.
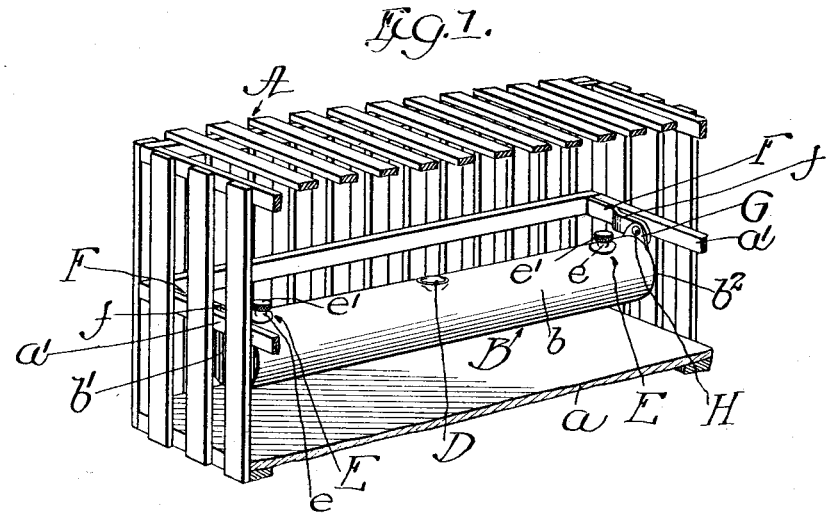
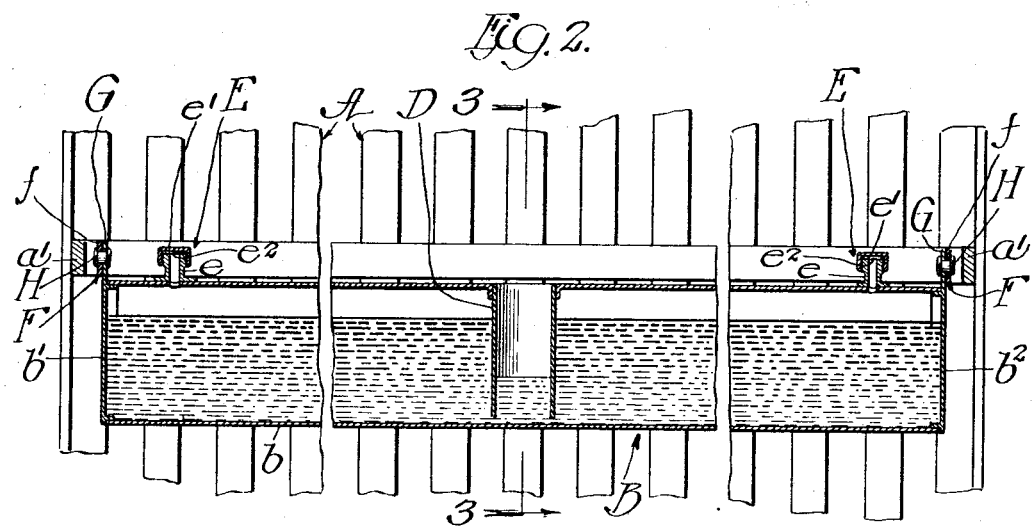
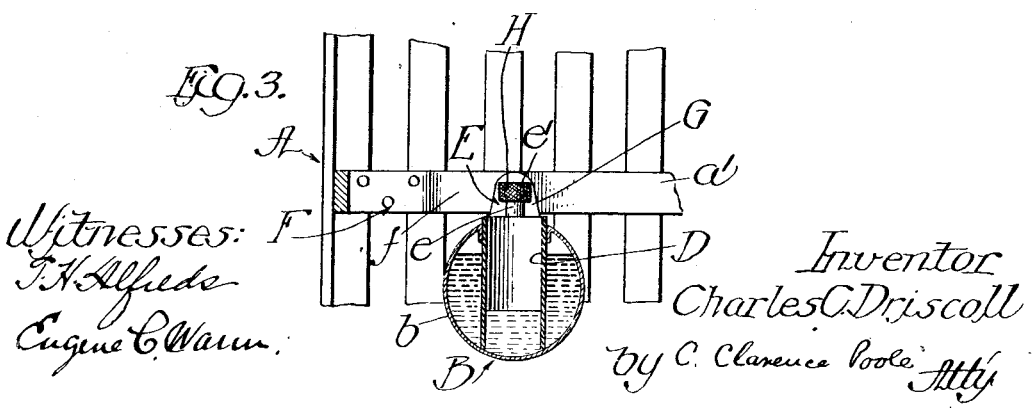
Witnesses:
Inventor
Charles C. Driscoll
by C. Clarence Poole Atty

UNITED STATES PATENT OFFICE.

CHARLES C. DRISCOLL, OF CHICAGO, ILLINOIS, ASSIGNOR OF ONE-HALF TO FREDERICK S. PARKE, OF CHICAGO, ILLINOIS.

WATERING DEVICE FOR POULTRY AND ANIMALS.

1,113,206. Specification of Letters Patent. Patented Oct. 13, 1914.

Application filed June 4, 1912. Serial No. 701,512.

*To all whom it may concern:*

Be it known that I, CHARLES C. DRISCOLL, a citizen of the United States, and a resident of Chicago, in the county of Cook and State of Illinois, have invented certain new and useful Improvements in Watering Devices for Poultry and Animals; and I do hereby declare that the following is a full, clear, and exact description thereof, reference being had to the accompanying drawings, and to the letters of reference marked thereon, which form a part of this specification.

This invention relates to a device in the nature of a watering fountain or tank adapted for use in portable, or shipping, poultry crates or coops, stock-cars, or other inclosures for carrying fowls or live-stock during transportation.

The invention has for one of its primary objects to support or suspend the watering device or tank in the coop or inclosure, in such a manner that it will always tend to remain in its normal position, thereby eliminating liability of spilling the water in the tank in the tipping or swaying and jarring of the coop or inclosure during transportation.

A further object of the invention is to so construct the watering device or tank that only a small amount of the water therein will be exposed and the same will be automatically self-supplying as the water is consumed by the fowls or live-stock, while at the same time the coop or inclosure may be tipped or tilted, or even placed in an inverted or up-side-down position, without danger of spilling any material part of the water in the tank.

The invention consists of the matters hereinafter described and more particularly pointed out in the appended claim.

In the accompanying drawings illustrating my invention Figure 1 is a fragmentary perspective view of a portable poultry crate or coop, showing a watering device constructed in accordance with my invention mounted therein; Fig. 2 is an enlarged fragmentary longitudinal section through the poultry coop and the watering device; Fig. 3 is a transverse vertical section taken in a plane indicated by the line 3—3 of Fig. 2.

Referring to the drawings illustrating my invention, the same is shown in connection with a portable poultry crate or coop A, which may be of any preferred construction, but as shown in the drawings said coop A is made rectangular in form, having a floor or bottom $a$ and the top, side and end walls of the familiar open or slat-work construction, so as to permit the free circulation of air therethrough. Pivotally mounted within said coop A and horizontally arranged above the floor $a$ thereof is a water receptacle or tank B. As shown in the drawings, said receptacle or tank B is cylindrical in form and of a length to extend the full length of the coop and is preferably located adjacent to and parallel with one of the side walls thereof. Said receptacle or tank B, as preferably constructed, has the form of an elongated cylinder, and is made of sheet metal; consisting of a tubular body or cylindric wall $b$ closed at its ends by end walls $b^1$ $b^2$; said end walls being soldered or otherwise secured at their margins to the ends of the tubular part $b$. The said receptacle or tank B is provided with an open upright tube D located centrally of the length of the same and extending from the top of the tubular body $b$ downwardly into the interior of the receptacle, said tube D being secured at its upper end in an aperture or opening provided therefor in the top wall of said tubular body. The upper end of said tube D is substantially flush with the top wall of the tubular body $b$ and is secured to the edge of the opening through which it extends. The lower end of said tube D preferably terminates near the lower part of the inner cylindrical wall of the tubular body $b$. From the above it follows, that said upright tube D has closed or air tight connection at its upper end with the top of the receptacle B and that the receptacle is entirely closed or air tight, except for the opening therein formed by the open tube D. The water within the cylindrical body $b$ may readily flow into the lower end of the tube D through the opening between the lower end of the same and the bottom of the inner cylindrical wall of said body $b$, as best shown in Fig. 2. Access by the fowls or other animals to the water within the tubular body $b$ is permitted through the tube D, into the lower part of which a small quantity of water rises so far as permitted by atmospheric pressure. The receptacle B is provided in its top wall with one or more normally closed air valves, as indicated by E, E. As shown, said air valves E, E are located in the top of the tubular wall b, near the ends of the receptacle and each embraces a short tube or nipple e, secured at its lower end to and projecting above the wall b together with a removable screw cap e′ adapted to close the bore of the nipple, which opens into the interior of the cylindric vessel B. A packing disk $e^2$, interposed between the upper end of the nipple e and cap e′, serves to provide an air tight joint between the nipple and cap, as common in air valves of this character. Said nipples e, e and the caps e′, e′ therefor, constitute as a whole two normally closed air valves for the receptacle or tank and which may be opened when desired to permit the escape of air from the receptacle.

F, F indicate metallic strips or plates constituting supporting brackets for the receptacle B. Said brackets F, F are secured to cross-braces or bars a′, a′ attached to or supported by the end walls of the coop. Said brackets F, F are located opposite each other and are each secured at one end to the said cross-braces a′, a′. The other or free ends f, f of said brackets are offset laterally or spaced inwardly from said cross-braces a′, a′.

G, G indicate upright arms or lugs connected with the end walls b′, $b^2$ of the receptacle B and extending above the top wall of the same. As shown in the drawings, said arms G, G are made integral with the end walls b′, $b^2$ of the receptacle (see Fig. 2). Said upright arms G, G are connected at their outer or upper ends to the offset ends f, f of the brackets F, F by pivot pins H, H. By reason of the construction above described, the elongated cylindrical receptacle B is pivotally hung at its ends within the coop A, and is permitted to swing about a horizontal axis located above the center of gravity of the said receptacle. As shown in the drawings, the pivot pins H, H are located at equal distances above the top of the tubular wall b, and by reason of this arrangement of said pins, the horizontal axis about which said receptacle B is allowed to swing, is parallel with the longitudinal axis of the receptacle. It will be noted that the pivot pins H, H are in horizontal alinement with each other and are located above the lower end of the upright tube D a distance greater than half the length of said tube. The arms or lugs G, G are pivoted inside of the offset ends of the brackets F, F, thereby permitting the receptacle B to swing or to turn completely about its pivots without said arms striking said brackets.

When in use the watering device or tank B hangs within the coop or crate A, in the manner above described, and as clearly shown in the several figures of the drawings. This is its normal position. Water for filling the receptacle or tank B is poured into the same through the tube D; the caps e′, e′ being partially unscrewed or removed from the nipples e, e to allow the air confined within the receptacle or tank B to escape as the water enters. When the tank is filled the caps e′, e′ are tightened or replaced. Thereafter by reason of the atmospheric pressure on the surface of the water in the lower end of said tube D, the water can rise therein only as permitted by the entrance of air to the receptacle, around or beneath the lower edge of the tube, as the water is consumed and its surface lowered in said tube. The tank B, being pivotally hung or mounted in the coop is permitted to swing or rotate upon a horizontal axis located above the center of gravity of the tank. Said tank will thus always seek and remain in its normal position, with the tube D in an upright or vertical position.

By reason of this arrangement, the coop A may be tipped and tilted at any angle in a plane at right angles to the longitudinal axis of the tank B, without danger of spilling the water therefrom. Moreover, the coop may be tilted so as to incline the receptacle endwise, without the escape of any water, unless tipped or tilted to a great extent or unless the coop be placed with one of its ends downward. As the tank will always be so mounted in the coop so as to extend lengthwise of the same, the coop will never need to be tipped endwise in the usual handling of the same far enough to permit any escape of water from the tank through the central tube D. Moreover, the tank B may be swung into an inverted or upsidedown position, in rough handling of the coop, without spilling the water therein, except perhaps the small quantity at any time in the lower end of the tube D, because in this position, as the water seeks the lowest point of the tank, the inner end of the tube D will be above the level of the water. Said tube D is supplied from the tank B only when by the withdrawal of water from the tube, air is permitted to pass beneath the lower end of the said tube and displace a part of the water in the tank. By reason of this construction, the tube D is constantly supplied with water as fast as it is consumed by the fowls or other animals drinking the same.

With the receptacle or tank B pivotally mounted in the coop with its horizontal axis located above its center of gravity, as above described, the coop may be set upon either one of its side walls or its top wall, said walls being parallel with the longitudinal axis of said tank, without liability of escape of any water from the tank, because under such circumstances the tank will, owing to the position of said axis and the weight of the tank, assume its normal position with the tube D vertical. It follows, therefore, that should the coop, when empty, and with the tank still full, or partially full of water, be placed with its side or top wall resting on the ground, the tank will swing about its horizontal axis and come into its normal position. From the above, it is manifest that all danger of spilling of the water from the tank during the handling of the coop, even when the latter is empty, is eliminated. It is merely necessary to avoid standing the coop on one of its ends in order to insure that no water will ever be spilled from the tank.

The tube D being located centrally of the length of the tank B, divides the tank into two compartments or chambers which communicate with each other around the sides of the tube. In case the coop stands upon one of its ends, the tank B will be in the same position, namely, standing endwise. The water in the tank will then seek the chamber at the lower end of the same and only that quantity of water will be spilled from the tank through the tube D which the lower chamber cannot accommodate. As soon as the coop is righted, the tank will automatically assume its normal position, and the water will immediately rise in the lower end of the upright tube D. By reason of the arrangement of the tube D as above described, not enough water is discharged from the tank when the same is placed in an endwise position as to materially lessen the utility thereof. As hereinbefore mentioned, the tank B may be swung into an inverted or upside-down position, without spilling the water therein, except the small quantity at any time in the lower end of the tube D. This plays an important part in the use of my device. Should the water in the tube D become foul, it may be emptied by swinging the tank B into an inverted position. As soon as the tank is released it will automatically swing back into its normal position, namely, with the tube D vertical, and the water will rise in the lower end of said tube. By inverting the tank B several times, the tube D may be rinsed.

It is obvious, that by making my watering device of the proper or appropriate dimensions, it may be used in a stock-car. When applied to such use, the tank may be mounted in position with its longitudinal axis transverse to the car, so that in the sudden stoppage and starting of the same, the tank will swing on its pivots, so as to prevent the escape of water through the central tube. A series of relatively short tanks may, however, be arranged along the side of the car and in such case the tanks will swing laterally in the swaying of the car. If a long tank were arranged lengthwise of the car the surging of the water lengthwise in the tank might result in the water being sometimes forced out through the central tube and for that reason it is preferred to use a plurality of shorter receptacles when it is desired to locate watering devices along the side of a car.

I claim as my invention—

A watering fountain of the class described, comprising an elongated hollow tank, an open-ended tube arranged in an upright position in said tank intermediate the ends thereof, said tube having its upper end projecting through and in closed connection with the top wall of the tank and its lower end terminating adjacent the bottom of the same; the lower end of the tube dipping into the water contained in said tank when the latter is in normal position, said tank being closed at its ends and throughout its length, except for the opening into the same afforded by said tube, a normally closed air-valve in the top wall of said tank, lugs provided at the ends of said tank and projecting above the top wall thereof, supporting members, and alined pivot pins connecting said lugs with said supporting members; the tank being supported so as to be free to swing on a horizontal axis located above its center of gravity and automatically right itself when swung out of its normal position.

In testimony, that I claim the foregoing as my invention I affix my signature in the presence of two witnesses, this 1st day of June A. D. 1912.

CHARLES C. DRISCOLL.

Witnesses:
FRED S. PARKE,
EUGENE C. WANN.

---

Copies of this patent may be obtained for five cents each, by addressing the "Commissioner of Patents, Washington, D. C."